Oct. 18, 1932.    W. ASHTON    1,883,751
ANIMAL MOUTH TONGS
Filed Jan. 13, 1930
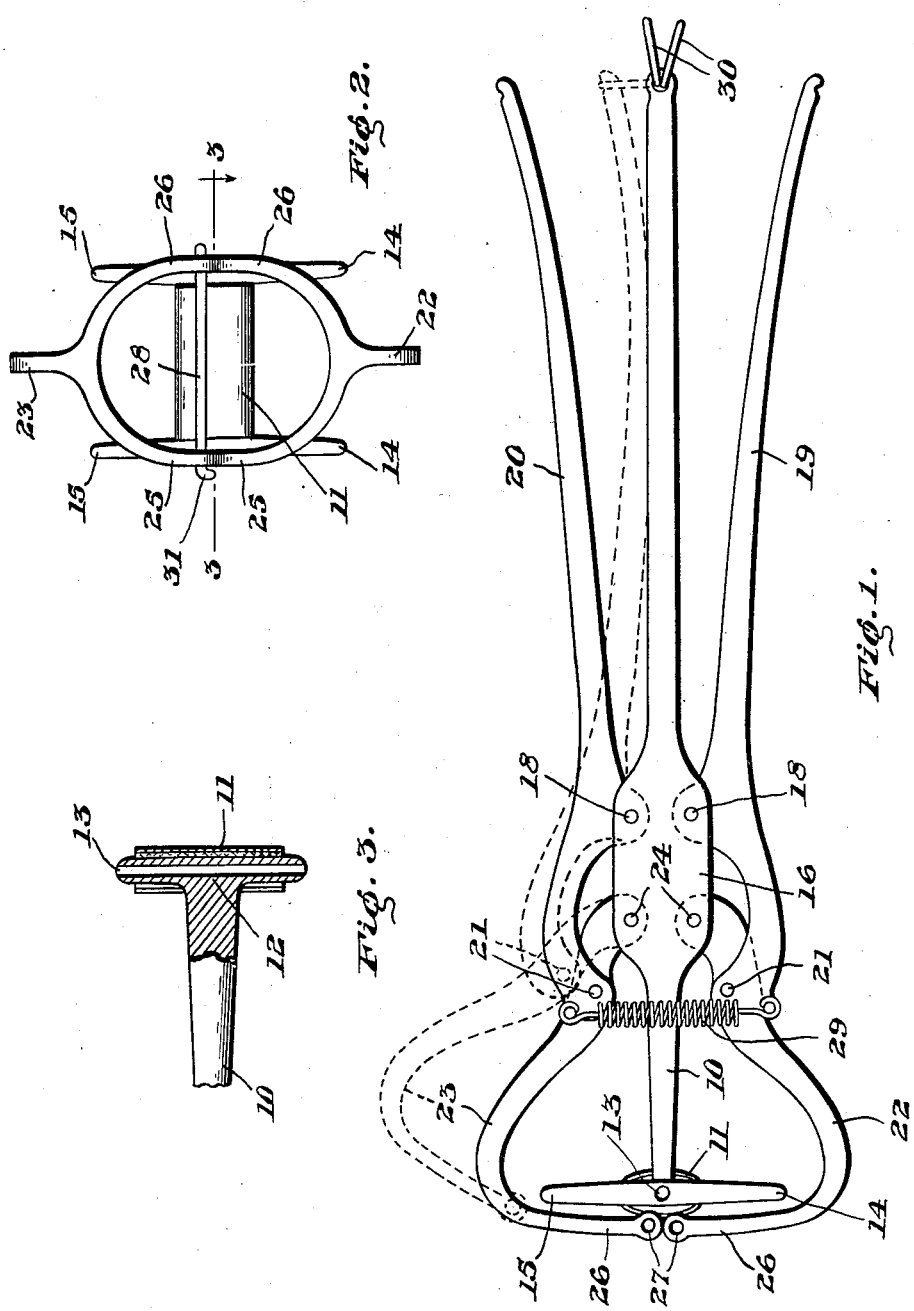
INVENTOR.
WARD ASHTON.
BY
ATT'Y.

Patented Oct. 18, 1932

1,883,751

UNITED STATES PATENT OFFICE

WARD ASHTON, OF OTTAWA, ONTARIO, CANADA, ASSIGNOR TO JOHN ORMOND KER, OF OTTAWA, ONTARIO, CANADA

ANIMAL MOUTH TONGS

Application filed January 13, 1930. Serial No. 420,460.

This invention relates to improvements in animal mouth tongs, and one object of the invention is to provide an instrument of this description of simple, durable and light construction, consisting of few parts, and particularly adapted for quick action.

A further object is to provide an instrument of this character that can be manufactured and placed on the market at much lower cost than similar instruments heretofore and at present in use, while more efficiently performing the various functions required of it.

Yet another and important object is to provide an instrument whereby the clamp portions can be individually locked in operative position and whereby the locked clamped portion can be operated independently of the unlocked clamped portion and independently of the bit portion to further distend the jaws of an animal.

With the foregoing and other objects hereinafter more fully referred to, the novel features of the invention comprise a pair of movable clamping jaws, formed with openings therethrough, a rigid bit or gag of suitable material co-operating with said jaws and provided with an opening therethrough, and locking means adapted to detachably engage with the openings in the jaws to lock them in clamped position, while permitting individual operation thereof. The locking means being designed when not in use to be detachably supported in the bit.

In the accompanying drawing, a preferred example is illustrated in which:

Fig. 1 is a side elevation.

Fig. 2 is a top plan view showing the locking bar in operative position.

Fig. 3 is a section on line 3—3 of Fig. 1.

Like numerals of reference designate corresponding parts throughout the different views.

Referring now more particularly to the drawing, 10, designates a rigid stem of any convenient construction on the end of which is rigidly secured a bit or gag 11, provided with a soft lining and a surface of sanitary material such as aluminum, which can readily be kept clean and wholesome and prevents injury to the teeth of an animal. The body portion 12, of the gag is transversely bored at 13, as hereinafter more fully referred to, while at each end are horizontally extending and suitably curved arms or prongs 14, and 15.

The stem 10, is formed with an enlarged portion 16, suitably split as at 17, to pivotally support in any well-known manner, as at 18, the handles 19, and 20. These handles are suitably curved to pivotally engage, as at 21, with the suitably curved jaws 22, and 23, the ends of which are pivotally mounted as at 24, in the enlarged portion 16, of the stem 10. The jaws 22, and 23, are intermediately bent and formed with semi-circular extremities 25, and 26, adapted in closed position (see Fig. 2) to form a circle overlapping the gag 11, and further adapted on the handles being compressed to open and register with the ends of the arms or prongs 14, and 15, of the gag.

The curved or semi-circular extremities 25, and 26, of the clamping jaws are formed with openings 27 for detachable engagement with a locking bar or rod 28, which is adapted to be inserted when the jaws of an animal are clamped, preferably above and across the inside of the lower jaw, thereby locking it in open position and in such manner that the mouth of the animal can be further opened by pressure on one of the operating handles. This is an essential feature of the improved mouth tongs and one which has been found of the greatest advantage in quick and safe handling of foxes and other animals to give them medicine, etc.

The handles 19, and 20, are spring-actuated in any well-known manner and here shown as by means of coiled spring 29, connecting the handles. I also provide rings 30, on the end of the stem 10, adapted to detachably engage with the ends of the handles. When the lock bar 28, is not in use, it is inserted in the bore or hole 13, in the gap, where it is always conveniently at hand for use. This bar is bent at one end as at 31, to facilitate handling and is also split to insure it remaining in position in the jaws or in the gag.

From the foregoing, the operation of the instrument will be apparent, and is as follows: The handles are grasped in one hand by the operator, opening the jaws 22, and 23, leaving an opening formed with walls, comprising the semi-circular ends of the jaws and the curved arms or extensions of the gag, the central portion of this opening being occupied by the gag. The fox or other animal, on the opened instrument being presented to him, grips the gag, pressure on the handles is then released, and the clamping jaws 22, and 23, automatically clamp the lower and upper jaws of the animal. The pin 28, is then withdrawn from the gag and slipped through the openings in one of the clamping jaws, preferably the lower, and across the inside thereof, thus locking the jaw in clamped position and permitting free and safe access to the animal's mouth. If it is desired to further open the mouth, the handle clamping the lower jaw may be compressed, causing it to expand this jaw locked and impossible of release until the locking pin 28 is withdrawn. In other words, the combination of the instrument clamping the outside of an animal's lower jaw and the locking pin co-operating therewith, practically clamping the inside of said jaw provides with the handles lever means for distending the animal's jaws while locking them securely.

The semi-circular extremities of the clamping jaws co-operating in open or closed position with the curved extensions of the gag provide a completely enclosed space in which is self-centered the gag. Furthermore, the jaws being individually operable make the instrument as a whole, reversible.

Various forms of the apparatus described will suggest themselves to those skilled in the art; it is, therefore, not intended that the present application should be limited to any particular form of construction. Modifications may, therefore, be made in the instrument above described within the scope of the claims, without departing from the spirit or scope thereof.

What I claim as my invention is:

1. An animal mouth tongs comprising a fixed gag having a bore therethrough, a pair of pivotally mounted spring-held clamping jaws co-operating with said gag and formed with openings therethrough, a locking bar normally carried in the bore of the gag, and designed for detachable engagement with the openings in either of the clamping jaws to lock the jaw of an animal gripping the gag.

2. The invention, according to claim 1, in which the locking bar is partially split to lock with the openings in the clamping jaws and engage with the gag respectively.

3. In an instrument of the character described, a stem provided at one end with a fixed gag and adapted to carry retaining means at the opposite end, a pair of clamping jaws having curved ends with openings in the extremities thereof, a pair of handles pivotally associated with the stem and pivotally connected to the jaws, a locking bar adapted to detachably engage with either of the jaws to further clamp and lock the jaw of an animal while being clamped by said jaws and on one of the handles being operated to further distend the mouth of the animal.

4. A reversible instrument of the character described comprising a fixed gag having openings therethrough and formed with curved prongs, a pair of clamping jaws co-operating with and movable, relative to the gag and formed with curved ends registering with the prongs of the gag, and having openings in the extremities thereof, a locking pin normally carried by the gag and adapted in operative position to individually engage with openings in the jaws, to clamp the inside of an animal's jaw, while being clamped outwardly by the instrument jaws.

5. A reversible instrument of the character described comprising a fixed gag having openings therethrough and formed with curved prongs, a pair of clamping jaws co-operating with and movable, relative to the gag and formed with curved ends registering with the prongs of the gag, and having openings in the extremities thereof, a locking pin normally carried by the gag and adapted in operative position to individually engage with openings in the jaws, to clamp the inside of an animal's jaw, while being clamped outwardly by the instrument jaws, handles pivotally associated with the stem and pivotally connected to the jaws, retaining members carried by the stem for detachable engagement with the handles to retain one of the clamping jaws in position while permitting further operations of the other clamping jaw and spring-actuating means for said jaws.

6. A reversible self centered animal mouth tongs comprising a suitably bored rigidly mounted gag, a jaw locking pin adapted for inoperative engagement with the gag, clamping jaws formed with openings and movable relative to the gag for operative engagement with the jaw locking pin whereby the jaws of an animal are rigidly secured while being clamped by the said clamping jaws.

7. An animal mouth tongs comprising a stem, a gag on the stem, a pair of clamping jaws pivotally connected to the stem, a pair of spring-held handles pivotally connected to the clamping jaws and pivotally mounted in the stem whereby the clamping jaws are normally retained in clamping position relative to the gag, retaining means carried by the stem for selective or collective engagement with said handles to lock the clamping jaws in unclamped position, a detachable locking pin normally carried in the gag, and means formed in the clamping jaws for engagement with said pin to lock the jaw of an animal when muzzled by the clamping jaws.

8. In an instrument of the character described, the combination with a gag having a hole therein and formed with prongs, of clamping members normally assuming a clamping position relative to said gag and co-operating with the prongs to form spaces on each side of the gag, a locking pin detachably carried in the gag, and means formed in the clamping members for engagement with the locking pin to lock the jaw of an animal muzzled by the clamping members.

In witness whereof I have hereunto set my hand.

WARD ASHTON.